(12) United States Patent
Akutsu et al.

(10) Patent No.: US 9,592,803 B2
(45) Date of Patent: Mar. 14, 2017

(54) VEHICLE CONTROL SYSTEM

(71) Applicant: NISSIN KOGYO CO., LTD., Ueda, Nagano (JP)

(72) Inventors: Kenta Akutsu, Nagano (JP); Kazumichi Eda, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/944,304

(22) Filed: Nov. 18, 2015

(65) Prior Publication Data

US 2016/0137176 A1 May 19, 2016

(30) Foreign Application Priority Data

Nov. 18, 2014 (JP) .................. 2014-233281

(51) Int. Cl.
*B60T 8/1755* (2006.01)

(52) U.S. Cl.
CPC ....... *B60T 8/17551* (2013.01); *B60T 2201/16* (2013.01); *B60T 2210/12* (2013.01)

(58) Field of Classification Search
CPC ............. B60T 8/17551; B60T 2201/16; B60T 2210/12
See application file for complete search history.

(56) References Cited

U.S. PATENT DOCUMENTS

2011/0178689 A1* 7/2011 Yasui .................. B60T 7/12
701/70

FOREIGN PATENT DOCUMENTS

JP 11070865 3/1999

* cited by examiner

*Primary Examiner* — Michael D Lang
(74) *Attorney, Agent, or Firm* — Andrew M. Calderon; Roberts Mlotkowski Safran Cole & Calderon, P.C.

(57) ABSTRACT

There is provided a vehicle control system. The vehicle control system includes a steering angle acquiring module, a yaw rate acquiring module that acquires a yaw rate, and a road surface friction coefficient estimation module. The vehicle control system further includes a behavior stabilization control module and a reduction gradient setting module. The behavior stabilization control module executes a behavior stabilization control to exert a braking force on a wheel brake when a vehicle is turning to thereby reduce a deviation between the yaw rate and a target yaw rate. And, the reduction gradient setting module sets a reduction gradient of the braking force when the behavior stabilization control is to be ended, based on the steering angle and the road surface friction coefficient.

15 Claims, 9 Drawing Sheets

|   |     | θ | | | |
|---|-----|------|------|------|------|
|   |     | 0~θ1 | θ1~θ2 | θ2~θ3 | θ3 OR MORE |
| μ | LV1 | A1 | A1 | A4 | A8 |
|   | LV2 | A2 | A2 | A5 | A8 |
|   | LV3 | A3 | A3 | A6 | A8 |
|   | LV4 | A3 | A3 | A7 | A8 |

VEHICLE CONTROL SYSTEM

CROSS-REFERENCE TO RELATED APPLICATION(S)

This application claims priority from Japanese Patent Application No. 2014-233281 filed on Nov. 18, 2014, the entire contents of which are incorporated herein by reference.

FIELD

The present invention relates to a vehicle control system which can execute a behavior stabilization control for reducing a deviation between a yaw rate and a target yaw rate by exerting a braking force on a wheel brake when a vehicle turns.

BACKGROUND

For example, a vehicle control system may be configured to execute a behavior stabilization control based on detection values detected by wheel speed sensors, a steering angle sensor, a yaw rate sensor and a lateral acceleration sensor (refer to JP-H11-070865-A). Such vehicle control system may restrict the occurrence of oversteer by exerting a braking force on turning outer wheels when the vehicle is put in an oversteer condition.

In the above-mentioned vehicle control system, in the event of the vehicle traveling straight ahead when ending the control of restricting the oversteer condition (that is, in the event of the steering angle being small) or the coefficient of friction on the road surface being low, in case the braking force that is being exerted on the turning outer wheels is reduced in one breath, the driver may feel the sensation of physical disorder as the braking force may be felt as being reduced abruptly. Alternatively, the braking force exerted may be reduced gradually when ending the control of restricting the oversteer condition to eliminate the sensation of abruptness. However, in this case, the timing at which the control ends may be delayed due to the braking force being reduced gradually, and the control may continue to be involved unnecessarily.

SUMMARY

An aspect of the present invention provides
a vehicle control system including:
a steering angle acquiring module that acquires a steering angle;
a yaw rate acquiring module that acquires a yaw rate;
a road surface friction coefficient estimation module that estimates a road surface friction coefficient;
a behavior stabilization control module that executes a behavior stabilization control to exert a braking force on a wheel brake when a vehicle is turning to thereby reduce a deviation between the yaw rate and a target yaw rate; and
a reduction gradient setting module that sets a reduction gradient of the braking force when the behavior stabilization control is to be ended, based on the steering angle and the road surface friction coefficient.

According to the configuration described above, since the reduction gradient of the braking force is set based on the steering angle and the road surface friction coefficient when ending the behavior stabilization control, for example, in such a situation that the driver feels easily the sensation of abruptness, the sensation of abruptness can be restricted from being felt by the driver by reducing the reduction gradient, whereas in such a situation that the driver feels the sensation of abruptness with difficulty, it is possible to end the behavior stabilization control quickly by increasing the reduction gradient.

There may also be provided, based on the above configuration,
the vehicle control system,
wherein the reduction gradient setting module sets so that the reduction gradient becomes smaller as the steering angle becomes smaller.

Since the driver feels the sensation of abruptness more easily as the steering angle resulting when the behavior stabilization control ends becomes smaller, it is possible to restrict well the driver from feeling the sensation of abruptness by setting the reduction gradient so as to become smaller as the steering angle becomes smaller. Additionally, the lateral acceleration exerted on the driver becomes greater as the steering angle resulting when the behavior stabilization control ends becomes greater, it is possible to end the behavior stabilization control quickly without making the driver feel the sensation of abruptness.

There may also be provided, based on the above configuration,
the vehicle control system,
wherein the reduction gradient setting module sets so that the reduction gradient becomes smaller as the road surface friction coefficient becomes lower.

Since the driver tends to feel the abruptness more easily as the road surface friction coefficient resulting when the behavior stabilization control ends becomes lower, by setting the reduction gradient so as to become smaller as the road surface friction coefficient becomes lower, it is possible to restrict well the driver from feeling the sensation of abruptness. The lateral acceleration exerted on the driver becomes greater as the road surface friction coefficient resulting when the behavior stabilization control ends becomes higher, thus making it difficult for the driver to feel the sensation of abruptness. Therefore, by setting the reduction gradient so as to become greater as the road surface friction coefficient becomes higher, it is possible to end the behavior stabilization control quickly without making the driver feel the sensation of abruptness.

There may also be provided, based on the above configuration,
the vehicle control system, further including:
a lateral acceleration acquiring module that acquires a lateral acceleration,
wherein the road surface friction coefficient estimating module estimates the road surface friction coefficient based on the lateral acceleration.

According to the configuration described above, it is possible to estimate the road surface friction coefficient appropriately based on the lateral acceleration.

There may also be provided, based on the above configuration,
the vehicle control system,
wherein the reduction gradient setting module sets the reduction gradient when a control of restricting an oversteer behavior of the vehicle is to be ended.

When the control ends which restricts the behavior of the vehicle which is under oversteer, the driver particularly tends to feel easily the sensation of abruptness, and therefore, the control can be executed appropriately so as to match the feeling of the driver by setting the reduction gradient when the control of restricting the behavior of the vehicle under oversteer ends.

According to the invention, it is possible not only to restrict the driver from feeling the sensation of abruptness when ending the behavior stabilization control but also to ends the control quickly in such a situation that the driver feels no sensation of abruptness.

DETAILED DESCRIPTION

An embodiment of the invention will be described referring to the drawings.

Figure 1:
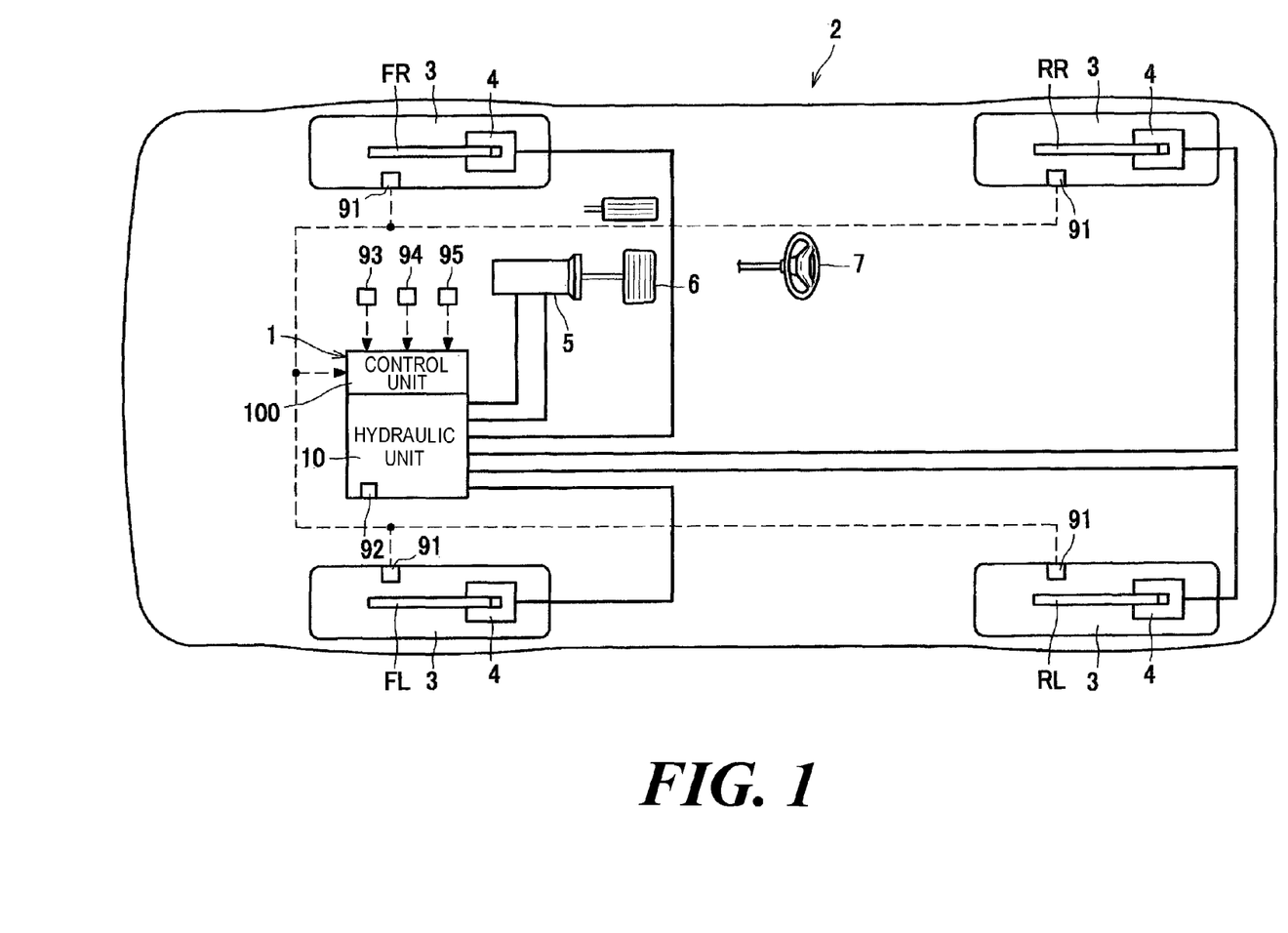
FIG. 1 is a block diagram of a vehicle including a vehicle brake hydraulic pressure control system according to an embodiment of the invention.

As shown in FIG. 1, a vehicle brake hydraulic pressure control system 1 controls braking force applied to wheels 3 of a vehicle 2 as required. The vehicle brake hydraulic pressure control system 1 includes mainly a hydraulic unit 10 in which hydraulic lines and various types of components are provided and a control unit 100 as an example of a vehicle control unit for controlling the various types of components in the hydraulic unit 10 as required.

Wheels brakes FL, RR, RL, FR are provided on the wheels 3, and wheel cylinders 4 are provided on the wheel brakes FL, RR, RL, FR. A hydraulic pressure is supplied to the wheel cylinders 4 from a master cylinder 5 which functions as a hydraulic pressure source to thereby generate braking force. The master cylinder 5 and the wheel cylinders 4 are connected to each other by the hydraulic unit 10. A brake hydraulic pressure is generated in the master cylinder 5 according to pedal effort exerted on a brake pedal 6 (a braking operation performed by the driver), and the hydraulic pressure so generated is controlled in the control unit 100 and the hydraulic unit 10 to thereby be supplied to the wheel cylinders 4.

Wheel speed sensors 91 for detecting wheel speeds of the wheels 3, a pressure sensor 92 for detecting a pressure in the master cylinder 5, a steering angle sensor 93 for detecting a steering angle θ of a steering wheel 7, a yaw rate sensor 94 for detecting an actual yaw rate Y of the vehicle 2, and a lateral acceleration sensor 95 for detecting a lateral acceleration G exerted on the vehicle 2 in a left-to-right direction are connected to the control unit 100. This control unit 100 includes, for example, a CPU (Central Processing Unit), a RAM (Random Access Memory), a ROM (Read Only Memory) and an input-output circuit and executes a control by performing various types of arithmetic operations based on inputs from the sensors 91 to 95 and programs and data stored on the ROM. The details of the control unit 100 will be described later.

Figure 2:
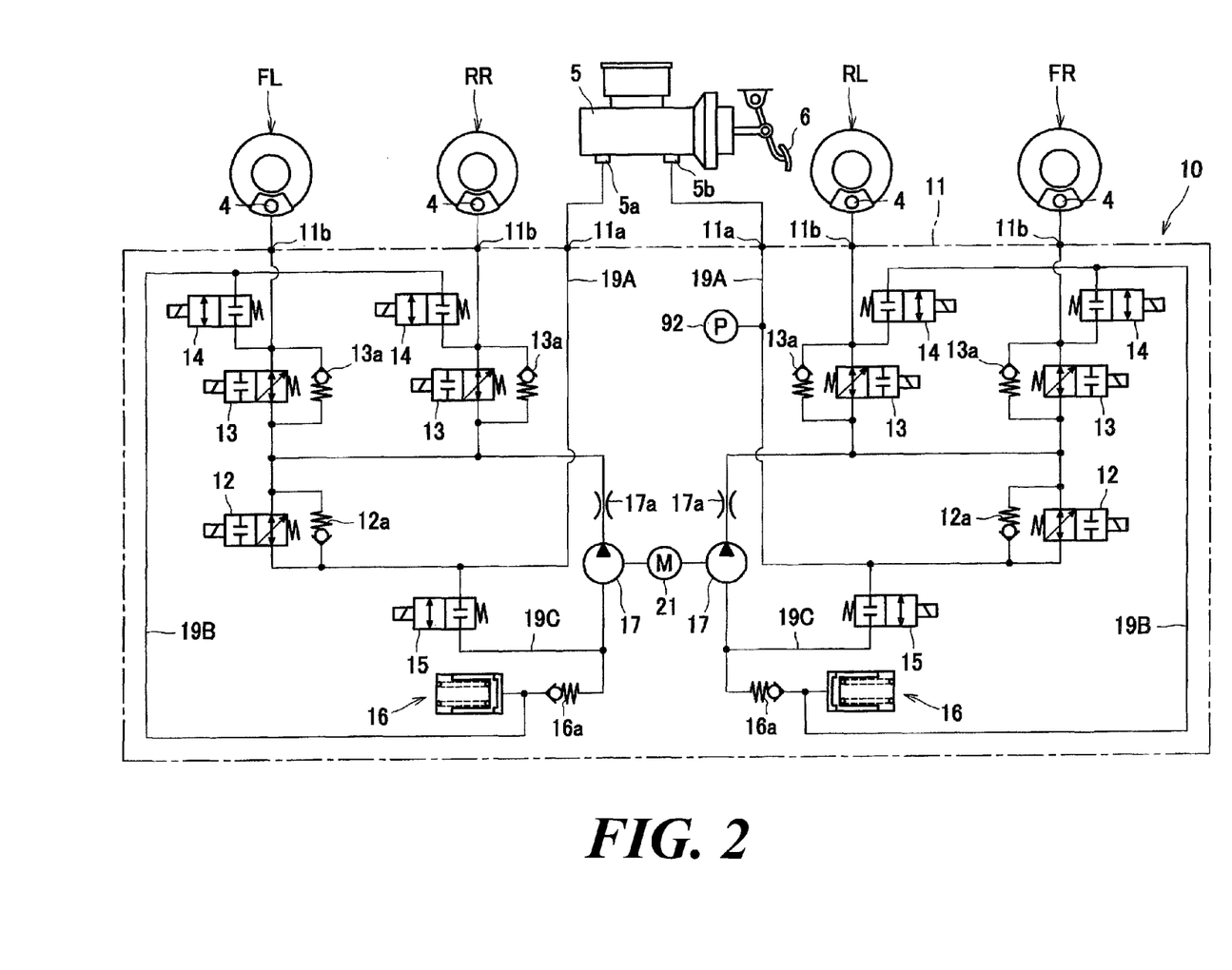
FIG. 2 is a block diagram showing the configuration of a hydraulic unit.

As shown in FIG. 2, the hydraulic unit 10 is disposed between the master cylinder 5 which functions as the hydraulic pressure source which generates a brake hydraulic pressure according to pedal effort exerted on the brake pedal 6 by the driver and the wheel brakes FR, FL, RR, RL.

The hydraulic unit 10 is configured by disposing hydraulic lines (hydraulic pressure lines) through which a brake fluid passes and various types of solenoid vales in a pump body 11 which is a base body of the hydraulic unit 10. Output ports 5a, 5b of the master cylinder 5 are connected to input ports 11a of the pump body 11, and output ports 11b of the pump body 11 are connected to the corresponding wheel brakes FL, RR, RL, FR. Normally, hydraulic lines communicating from the input ports 11a to the output ports 11b of the pump body 11 are established, so that the pedal effort exerted on the brake pedal 6 is transmitted to the wheel brakes FL, RR, RL, FR. A hydraulic pressure system connected to the output port 5a of the master cylinder 5 is connected to the wheel brakes FL, RR, and a hydraulic pressure system connected to the output port 5b of the master cylinder 5 is connected to the wheel brakes RL, FR, and these systems have substantially the same configuration.

A pressure regulator valve 12 is provided on each of the hydraulic pressure systems along a hydraulic pressure line which connects the input port 11a with the output ports 11b. This pressure regulator valve 12 is a normally open proportional solenoid valve which can regulate a difference in hydraulic pressure between an upstream and a downstream thereof according to an electric current supplied thereto. A check valve 12a is provided in parallel to the pressure regulator valve 12, and this check valve 12a permits only a flow to the output ports 11b.

The hydraulic pressure lines extending from the pressure regulator valves 12 towards the wheel brakes FL, RR, RL, FR branch off halfway down to the wheel brakes FL, RR, RL, FR so as to connected to the output ports 11b. Then, inlet valves 13, which are normally open proportional solenoid valves, are disposed individually on the hydraulic pressure lines corresponding to the output ports 11b. A check valve 13a is provided in parallel to each of the inlet valves 13, and this check valve 13a permits only a flow towards the pressure regulator valve 12.

Return hydraulic pressure lines 19B are provided which each extend from a hydraulic pressure line between the output ports 11b and the corresponding inlet valves 13 to connect to portions lying between the pressure regulator valve 12 and the inlet valves 13 via output valves 14 which are made up individually of normally closed solenoid valves.

A reservoir 16 which absorbs temporarily an excessive brake fluid, a check valve 16a, a pump 17 and an orifice 17a are provided on each of the return hydraulic pressure lines 19B sequentially in that order from the side of outlet valve 14. The check valve 16a permits only a flow towards the portions lying between the pressure regulator valve 12 and the inlet valves 13. The pump 17 is driven by a motor 21 so as to generate a pressure towards the portions lying between the pressure regulator valve 12 and the inlet valves 13. The orifice 17a dampens pulsations of the pressure of a brake fluid discharged from the pump 17 and pulsations generated by the operation of the pressure regulator valve 12.

An induction hydraulic pressure line 19A which connects the input port 11a and the pressure regulator valve 12 and a portion on the return hydraulic pressure line 19B which lies between the check valve 16a and the pump 17 are connected by an intake hydraulic pressure line 19C. Then, an intake valve 15, which is a normally closed solenoid valve, is provided on the intake hydraulic pressure line 19C.

The pressure sensor 92 is provided only on the induction hydraulic pressure line 19A which corresponds to the output port 5b of the master cylinder 5. The pressure sensor 92 is connected to the control unit 100.

In the hydraulic unit 10 which is configured in the way described above, normally, the solenoid valves are not energized, and a brake hydraulic pressure which is induced from the input ports 11a is outputted to the output ports 11b by way of the pressure regulator valves 12 and the inlet valves 13 to thereby be applied to the corresponding wheel cylinders 4 as it is. Then, in the event of reducing the excessive brake hydraulic pressures at the wheel cylinders 4 as when an anti-lock braking control is executed, the corresponding inlet valves 13 are closed, whereas the corresponding outlet valves 14 are opened, so that the brake fluid is caused to flow to the reservoirs 16 by way of the return hydraulic pressure lines 19B, thereby making it possible to remove the brake fluid in the wheel cylinders 4. Additionally, in the event of the wheel cylinders 4 being pressurized without operation of the brake pedal 6 by the driver, the intake valves 15 are opened, and the motor 21 is driven, whereby the brake fluid can be supplied positively to the wheel cylinders 4 by means of pressurization by the pump 17. In the event of the degree of pressurization of the wheel cylinders 4 being controlled, the pressurization of the wheel cylinders 4 can be controlled by controlling the electric current flowing to the pressure regulator valves 12.

Figure 3:
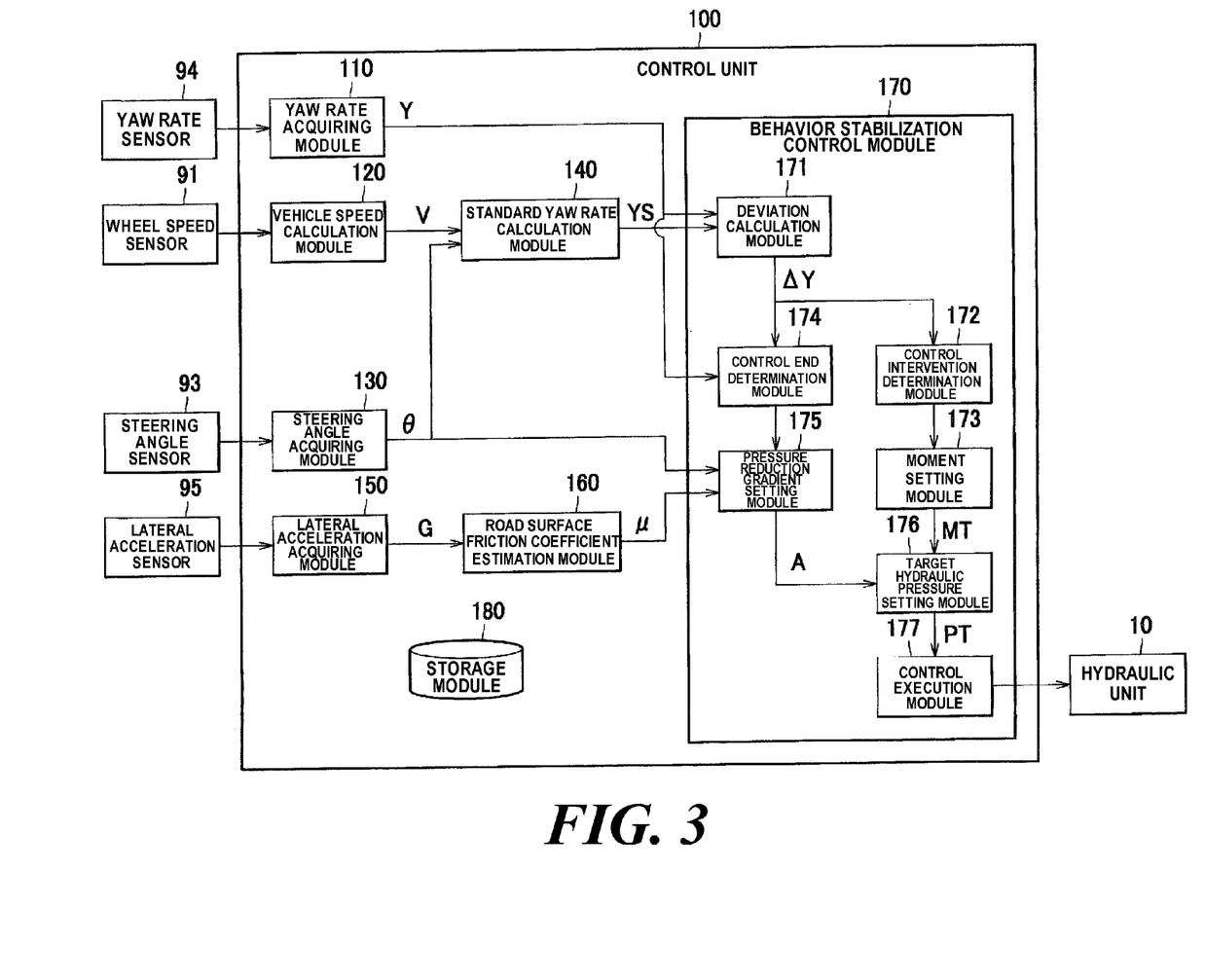
FIG. 3 is a block diagram showing the configuration of a control unit.

Nest, the control unit 100 will be described in detail.

The control unit 100 executes a control to stabilize the behavior of the vehicle 2 through application of a braking force which corresponds to a set target braking force to turning outer wheels of the vehicle 2 by controlling the hydraulic unit 10. Because of this, as shown in FIG. 3, the control unit 100 includes a yaw rate acquiring module 110, a vehicle speed calculation module 120, a steering angle acquiring module 130, a standard yaw rate calculation module 140, a lateral acceleration acquiring module 150, a road surface friction coefficient estimation module 160, a behavior stabilization control module 170 and a storage module 180. Since the output of the pressure sensor 92 has nothing to do with the characteristic configuration of the vehicle brake hydraulic pressure control system 1 of the invention, the pressure sensor 92 is omitted from the block diagram shown in FIG. 3. In the following description, a steering angle θ, a yaw rate Y, a standard yaw rate YS which is an example of a target yaw rate and a lateral acceleration G take positive values for a left turn and negative values for a right turn.

The yaw rate acquiring module 110 acquires information on an actual yaw rate Y of the vehicle 2 from the yaw rate sensor 94. The acquired yaw rate Y is outputted to the behavior stabilization control module 170.

The vehicle speed calculation module 120 acquires information on wheels speeds (pulse signals from the wheel speed sensors 91) for every control cycle from the wheel speed sensors 91 to calculate wheel speeds and a vehicle speed V by using a known method. The calculated vehicle speed V is outputted to the standard yaw rate calculation module 140.

The steering angle acquiring module 130 acquires information on a steering angle θ for every control cycle from the steering angle sensor 93. The steering angle θ is outputted to the standard yaw rate calculation module 140 and the behavior stabilization control module 170.

The standard yaw rate calculation module 140 calculates a standard yaw rate YS which is a yaw rate intended by the driver by a known method based on the steering angle θ and the vehicle speed V. The calculated yaw rate YS is outputted to the behavior stabilization control module 170.

The lateral acceleration acquiring module 150 acquires information on a lateral acceleration G for every control cycle from the lateral acceleration sensor 95. The lateral acceleration G is outputted to the road surface friction coefficient estimation module 160.

The road surface friction coefficient estimation module 160 estimates a road surface friction coefficient μ based on the lateral acceleration G. For example, the road surface friction coefficient estimation module 160 estimates a road surface friction coefficient μ based on a map or a calculation expression showing a relationship between lateral acceleration G and road surface friction coefficient μ which is stored on the storage module 180 and the lateral acceleration G. The road surface friction coefficient μ is outputted to the behavior stabilization control module 170.

The relationship between lateral acceleration G and road surface friction coefficient μ may be set so that the road surface friction coefficient μ becomes greater as the magnitude of the lateral acceleration G becomes greater.

The behavior stabilization control module 170 executes a behavior stabilization control which reduces a deviation ΔY between the yaw rate Y and the standard yaw rate YS by applying a braking force to the wheel brakes FL, RR, RL, FR on the turning outer wheels of the vehicle 2 which is turning. In this embodiment, a target hydraulic pressure PT which controls the braking forces at the wheel brakes FL, RR, RL, FR is set as a value corresponding to a target braking force, and the hydraulic unit 10 is controlled so that the wheel cylinder pressures at the wheel brakes FL, RR, RL, FR of the turning outer wheels becomes the target hydraulic pressure PT. Namely, the breaking force corresponds to the target hydraulic pressure PT. To execute this control, the behavior stabilization control module 170 has a deviation calculation module 171, a control intervention determination module 172, a moment setting module 173, a control end determination module 174, a pressure reduction gradient setting module 175, a target hydraulic pressure setting module 176 and a control execution module 177.

The deviation calculation module 171 calculates a deviation ΔY (=YS−Y) between the yaw rate Y and the standard yaw rate YS. The deviation ΔY is outputted to the control intervention determination module 172 and the control end determination module 174.

Figure 8:
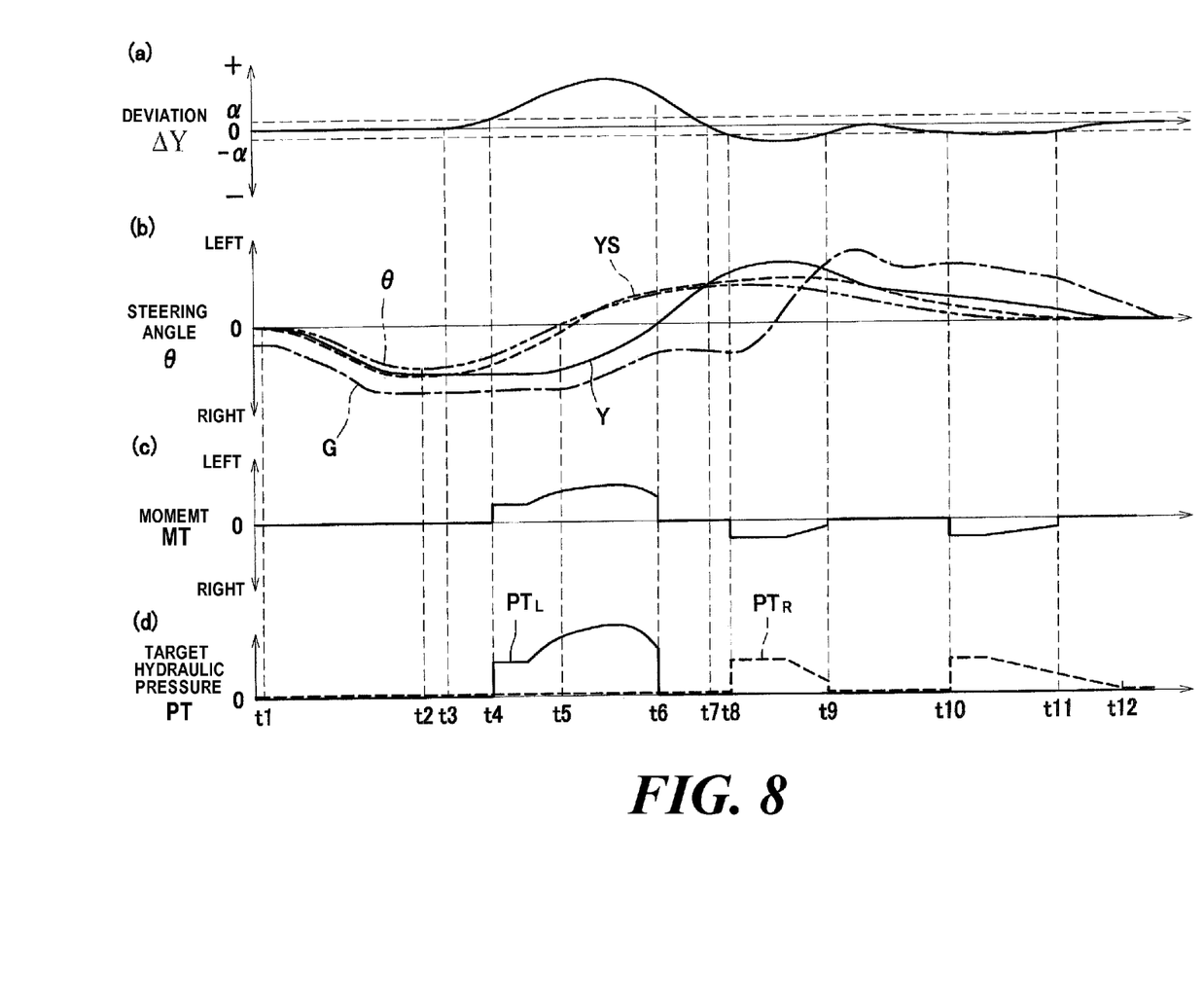
FIG. 8 shows timing charts (a) to (d) illustrating changes in deviation, steering angle, various yaw rates, lateral acceleration, moment and target hydraulic pressure to explain the operation of a vehicle behavior control.

The control intervention determination module 172 determines whether or not the absolute value of the deviation ΔY is equal to or greater than a predetermined value α, and in case the control intervention determination module 172 determines that the deviation ΔY is equal to or greater than the predetermined value α, determining that the vehicle 2 is under oversteer, the control intervention determination module 172 starts the behavior stabilization control. As shown in FIG. 8(a), in the event of the deviation ΔY being positive, the control intervention determination module 172 compares the deviation ΔY with a positive threshold α for a right turn, and in the event of the deviation ΔY being negative, the control intervention determination module 172 compares the deviation ΔY with a negative threshold −α for a left turn. In the event of the deviation ΔY being equal to or greater than the positive threshold α or equal to or smaller than the negative threshold −α, the control intervention determination module 172 has a function to determine that the vehicle 2 is under oversteer. In this embodiment, the respective absolute values of the positive and negative thresholds take the same value, that is, the predetermined value α.

By adopting this configuration, by determining whether or not the absolute value of the deviation ΔY is equal to or greater than the predetermined value α, the control intervention determination module 172 determines whether or not the deviation ΔY is equal to or greater than the positive threshold α or equal to or smaller than the negative threshold −α. The thresholds may be different for the right turn and the left turn, or the thresholds may be corrected according to other conditions.

When determining to start the behavior stabilization control, the control intervention determination module 172 changes a control mode M from a non-controlling mode (M=0) to a controlling mode (M=1).

The moment setting module 173 sets a moment MT which reduces the deviation ΔY based on the deviation ΔY in the event of the control mode M being the controlling mode. To describe this specifically, in the event of the deviation ΔY being positive, that is, in the event that the vehicle 2 is put in an oversteer condition while it is taking a right turn, the moment setting module 173 sets a counterclockwise or leftwards moment MT which cancels a rightward yaw rate Y which is being exerted on the vehicle 2 then. The moment MT is outputted to the target hydraulic pressure setting module 176.

In the event of the deviation ΔY being negative, that is, in the event that the vehicle 2 is put in an oversteer condition while it is taking a left turn, the moment setting module 173 sets a rightward moment MT which cancels the leftward yaw rate Y which is being exerted on the vehicle 2 then. The moment MT is then outputted to the target hydraulic pressure setting module 176.

The control end determination module 174 determines on an end of the behavior stabilization control. Specifically speaking, in the event of the absolute value of the deviation ΔY becoming smaller than the predetermined value α or in the event of the direction of the yaw rate Y being switched, determining that the oversteer condition is eliminated, the control end determination module 174 determines that the behavior stabilization control should end. In this embodiment, whether or not the direction of the yaw rate Y is switched is determined by judging whether or not a value obtained by multiplying the current yaw rate Yn by the previous yaw rate Yn−1 is equal to or smaller than 0, that is, whether or not Yn·Yn−2≤0. In this embodiment, the subscript "n" added to a variable denotes that the variable is the current value, and n−1 denotes that the variable is the previous value. Determining that the behavior stabilization control should end, the control end determination module 174 switches the control mode M to an end processing mode (M=2).

The pressure reduction gradient setting module 175 sets a pressure reduction gradient A for the brake hydraulic pressure in the wheel cylinder H (hereinafter, also referred to as a "wheel cylinder pressure") based on the steering angle θ and the road surface friction coefficient μ when the behavior stabilization control ends or specifically when the control ends of restricting the behavior of the vehicle 2 which is under oversteer. Specifically speaking, the pressure reduction gradient setting module 175 sets a pressure reduction gradient A (an amount of pressure reduction per unit time) for the wheel cylinder pressure based on a gradient setting map (refer to FIG. 4) which is stored on the storage module 180, the steering angle θ and the road surface friction coefficient μ in the event of the control mode M having been switched to the end processing mode which is now being performed.

Figure 4:
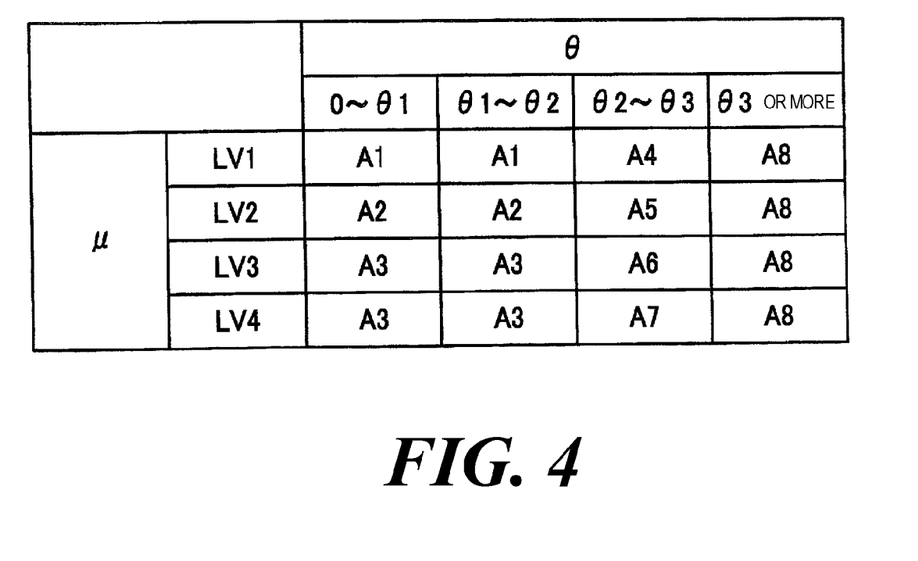
FIG. 4 is a gradient setting map showing a relationship between steering angle, road surface friction coefficient and pressure reduction gradient.

Referring to FIG. 4, the gradient setting map will be described. In FIG. 4, as to numerals added to the ends of the parameters (the steering angle θ, a range LV of road surface friction coefficient μ, the pressure reduction gradient A), a greater numeral indicates a greater parameter value. For example, in relation to the pressure reduction gradient A, A2 is greater than A1. LV denotes the range of the road surface friction coefficient μ, and LV4 indicates a range which corresponds to a high μ path, LV3 indicates a range which corresponds to a middle μ path whose friction coefficient is lower than that of the high μ path indicated by LV4, LV2 indicates a range which corresponds to a low μ path whose friction coefficient is lower than that of the middle μ path indicated by LV3, and LV1 indicates a range which corresponds to an extremely low μ path whose friction coefficient is lower than that of the low μ path indicated by LV2. Additionally, 0 to θ1 indicates a range of 0≤θ≤θ1, θ1 to θ2 indicates a range of θ≤θ≤θ2, and θ2 to θ3 indicates a range of θ2≤θ≤θ3.

The gradient setting map is set so that the pressure reduction gradient A becomes smaller as the steering angle θ becomes smaller and that the pressure reduction gradient A becomes smaller as the road surface friction coefficient μ becomes smaller. "The pressure reduction gradient A becomes smaller as the steering angle θ becomes smaller" does not necessarily mean that θ and A are proportional as shown in FIG. 4 but may merely mean that a pressure reduction gradient A corresponding to a great steering angle θ should take the same value as or a greater value than a value of a pressure reduction gradient A which corresponds to a steering angle θ which is smaller than the great steering angle θ. This will also be true with the road surface friction coefficient μ.

Returning to FIG. 3, once it has set the pressure reduction gradient A, the pressure reduction gradient setting module 175 outputs the set pressure reduction gradient A to the target hydraulic pressure setting module 176.

The target hydraulic pressure setting module 176 sets a target hydraulic pressure PT according to whether the control mode M is in the controlling mode or in the end processing mode. Firstly, an event will be described in which the control mode M is the controlling mode. In the controlling mode, the target hydraulic pressure setting module 176 sets the target hydraulic pressure PT based on the moment MT so that the target hydraulic pressure PT becomes greater as the moment MT becomes greater.

Next, an event will be described in which the control mode M is the end processing mode. In the end processing mode, the target hydraulic pressure setting module 176 sets a current target hydraulic pressure PTn based on the pressure reduction gradient A and the previous target hydraulic pressure PTn−1. Specifically speaking, the target hydraulic pressure setting module 176 calculates the current target hydraulic pressure PTn by subtracting the pressure reduction gradient A, that is, the amount of pressure reduction per unit time from the previous target hydraulic pressure PTn−1.

Because of this, in the end processing mode, the target hydraulic pressure PT gradually reduces along the pressure reduction gradient A which is set by the pressure reduction gradient setting module 175. In the event that the previous target hydraulic pressure PTn−1 is smaller than the amount of pressure reduction per unit time, it is set so that the current target hydraulic pressure PTn becomes 0. In the event that the current target hydraulic pressure PTn becomes 0, the target hydraulic pressure setting module 176 changes the control mode M to the non-controlling mode (M=0).

The control execution module 177 controls the hydraulic unit 10 based on the target hydraulic pressure PT which is set by the target hydraulic pressure setting module 176 so that the wheel cylinder pressures of the turning outer wheels become the target hydraulic pressure PT. Although the detailed description of this control will be omitted herein since the control is known, to describe the control briefly, the control execution module 177 controls so that the pump 17 is driven by driving the motor 21, and an appropriate electric current is caused to flow to the pressure regulator valve 12 after the intake valve 15 is opened.

The storage module 180 stores constants, parameters, control modes, maps and calculation results which are necessary for the operation of the control unit 100 as required.

Figure 5:
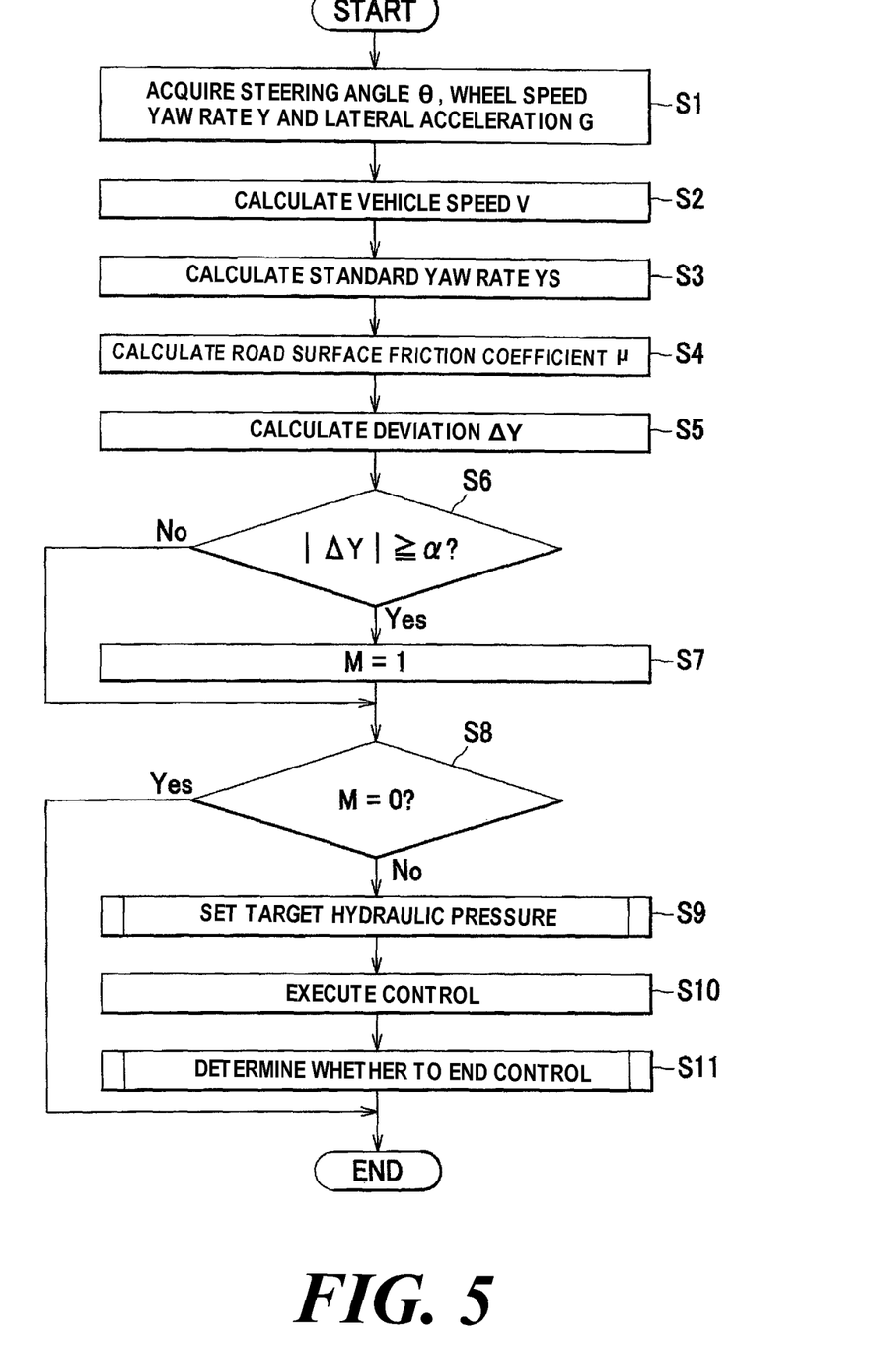
FIG. 5 is a flowchart showing an overall processing of a behavior stabilization control.

Referring to FIG. 5, operations performed by the control unit 100 of the vehicle brake hydraulic pressure control system 1 which is configured as has been described heretofore will be described. Operations shown in FIG. 5 are performed repeatedly for every control cycle. An initial value of the control mode M is 0.

Firstly, the steering angle acquiring module 130 acquires a steering angle θ from the steering angle sensor 93, the vehicle speed calculation module 120 acquires wheel speeds from the wheel speed sensors 91, the yaw rate acquiring module 110 acquires a yaw rate Y from the yaw rate sensor 94, and the lateral acceleration acquiring module 150 acquires a lateral acceleration G from the lateral acceleration sensor 95 (S1). Then, the vehicle speed calculation module 120 calculates a vehicle speed V from the wheels speeds (S2). Next, the standard yaw rate calculation module 140 calculates a standard yaw rate YS based on the steering angle θ and the vehicle speed V (S3). The road surface friction coefficient estimation module 160 estimates a road surface friction coefficient μ based on the lateral acceleration G (S4). The deviation calculation module 171 calculates a deviation ΔY based on the yaw rate Y and the standard yaw rate YS (S5).

Next, the control intervention determination module 172 determines whether or not the absolute value of the deviation ΔY is equal to or greater than the predetermined value α (S6). If it is determined that the absolute value of the deviation ΔY is equal to or greater than the predetermined value α (S6, Yes), the control intervention determination module 172 determines that the control should start and switches the control mode M to 1 (S7). If it is determined that the absolute value of the deviation ΔY is smaller than the predetermined value α (S6, No), the control intervention determination module 172 does not shift the control module M, and the flow of the behavior stabilization control proceeds to step S8.

Then, the behavior stabilization control module 170 determines whether or not the control mode M is 0, that is, whether or not the control mode M is the non-controlling mode. If it is determined that the control mode M is not 0 (S8, No: if M=1 or 2), the behavior stabilization control module 170 executes operations in step S9 to step S11, whereas if it is determined that the control mode M is 0 (S8, Yes), the behavior stabilization control module 170 ends the series of operations.

Figure 6:
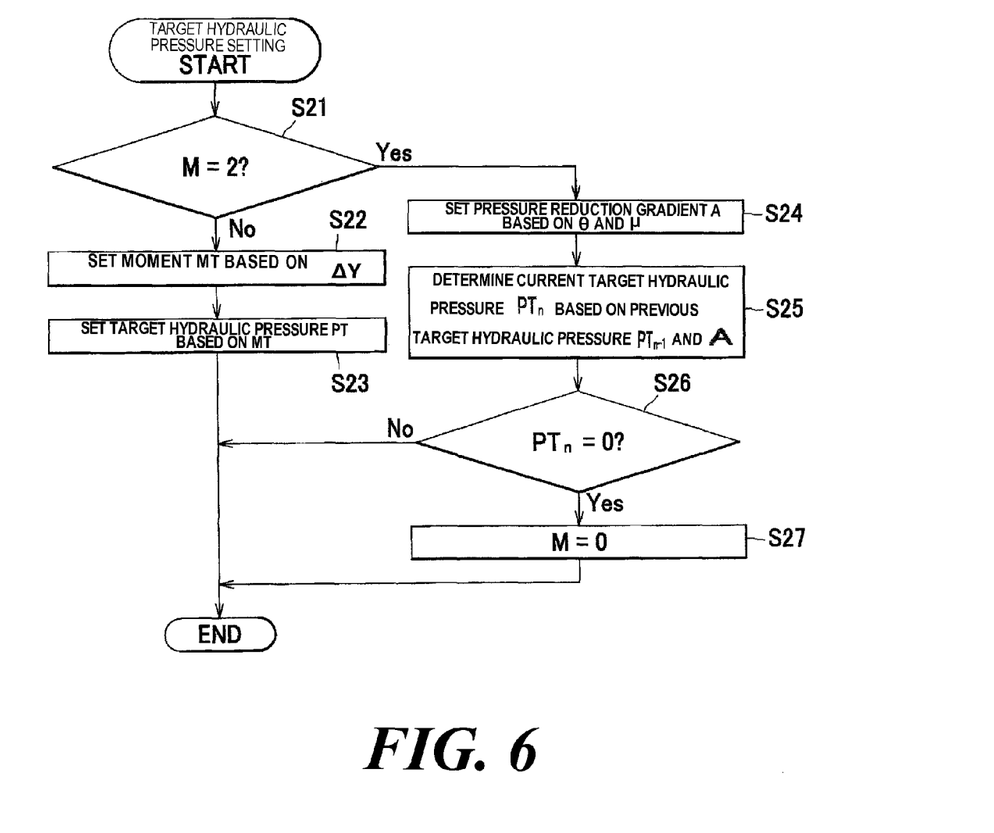
FIG. 6 is a flowchart showing a target hydraulic pressure setting process.

In step S9, the behavior stabilization control module 170 sets a target hydraulic pressure PT. As shown in FIG. 6, the target hydraulic pressure setting module 176 determines whether or not the control mode M is 2 (S21). If it is determined in step S21 that the control mode M is not 2, that is, if it is determined that the control mode M is 1 (No), the moment setting module 173 sets a moment MT based on the deviation ΔY (S22). Thereafter, the target hydraulic pressure setting module 176 sets a target hydraulic pressure PT based on the moment MT (S23) and ends the series of operations.

If it is determined in step S21 that the control mode M is 2, that is, if it is determined that the control mode M is the end processing mode (Yes), the pressure reduction gradient module 175 sets a pressure reduction gradient A based on the steering angle θ, the road surface friction coefficient μ and the gradient setting map shown in FIG. 4 (s24). Thereafter, the target hydraulic pressure setting module 176 determines on a current target hydraulic pressure Ptn based on the previous target hydraulic pressure PTn−1 and the pressure reduction gradient A (S25). Thereafter, if the current target hydraulic pressure PTn is 0 (S26, Yes), which means that the end processing is completed, and therefore, the target hydraulic pressure setting module 176 shifts the control mode M to 0 (S27). On the other hand, if the current target hydraulic pressure PTn is not 0 (S26, No), the target hydraulic pressure setting module 176 ends the series of operations without shifting the control mode M.

When the target hydraulic pressure PT is set in the way described above, returning to FIG. 5, the control execution module 177 controls the hydraulic unit 10 so that the hydraulic pressures in the wheel cylinders H of the turning outer wheels become the target hydraulic pressure PT (S10).

Figure 7:
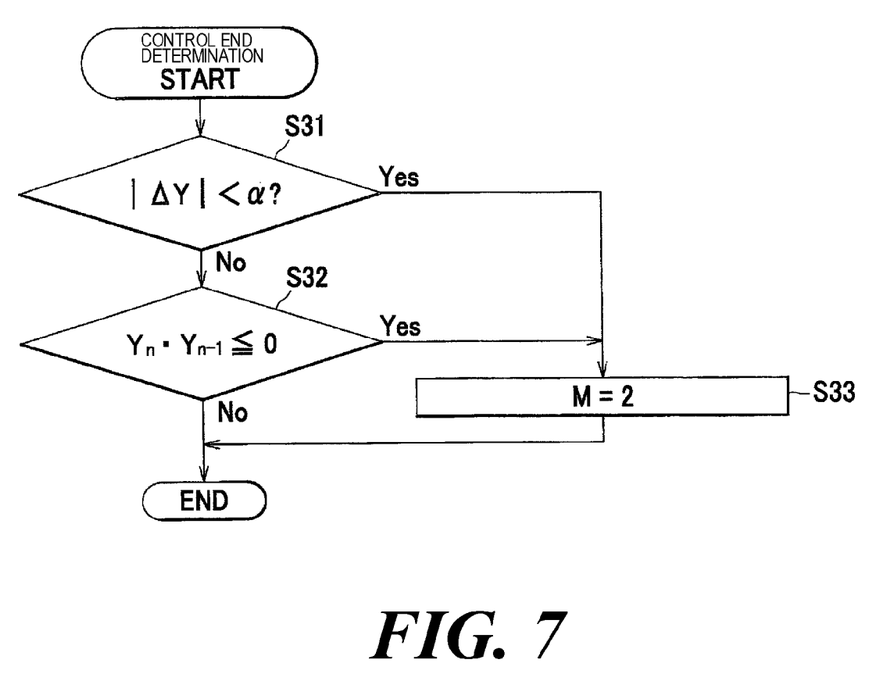
FIG. 7 is a flowchart showing a control ending determination process.

Next, the control end determination module 174 executes a determination on whether to end the behavior stabilization control in step S11. Specifically speaking, as shown in FIG. 7, the control end determination module 174 determines whether or not the absolute value of the deviation ΔY is smaller than the predetermined value α, and if it is determined that the absolute value of the deviation ΔY is smaller than the predetermined value α (S31, Yes), the control end determination module 174 determines that the behavior stabilization control should end and shifts the control mode M to 2 which indicates that the end of the behavior stabilization control is being processed (S33).

Even if the absolute value of the deviation ΔY is not smaller than the predetermined value α (S31, No), the control end determination module 174 determines whether or not Yn·Yn−1≤0. If it is determined that Yn·Yn−1≤0, to describe this in detail, if the direction of the yaw rate is switched (S32, Yes), the control end determination module 174 determines that the behavior stabilization control should end and shifts the control mode M to 2 which indicates that the end of the behavior stabilization control is being processed (S33).

On the other hand, if it is not determined that Yn·Yn−1≤0 (S32, No), the control end determination module 174 ends the series of operations without shifting the control mode M.

Changes in the parameters which occur when the controls are executed as described above will be described by reference to FIGS. 8 and 9. In FIG. 8(b), as a matter of convenience, graphs of yaw rate Y, standard yaw rate YS, steering angle θ and lateral acceleration G are drawn as being superposed on one another. In FIG. 8(b), the yaw rate Y, standard yaw rate YS, steering angle θ and lateral acceleration G take positive values for a left turn and take negative values for a right turn.

An example shown in FIG. 8 represents changes in the parameters in such a situation that the driver turns a steering wheel 7 to the right from a steering wheel position which allows the vehicle to be driven straight ahead, then turns back to the left and then turns back to the right to the steering wheel position which allows the vehicle to be driven straight ahead. To describe this in detail, as indicated by a change in steering angle θ shown in FIG. 8(*b*), the driver turns the steering wheel 7 to the right from the steering wheel position which allows the vehicle to be driven straight ahead during a period of time from time t1 to time t5 and turns the steering wheel 7 to the left from the steering wheel position which allows the vehicle to be driven straight ahead during a period of time from t5 to t11.

As shown in FIG. 8(*b*), when the driver turns the steering wheel 7 to the right at time t1 and then turns it back to the left at time t2, that is, when the driver turns the steering wheel 7 back to the steering wheel position which allows the vehicle to be driven straight ahead while the vehicle 2 is taking a right turn, the standard yaw rate YS is getting greater than the yaw rate Y (the absolute value is getting smaller) from time t3 onward. As this occurs, since the vehicle 2 is taking the right turn, the standard yaw rate YS and the yaw rate Y both take negative values, and as shown in FIG. 8(*a*), the deviation ΔY is calculated as a positive value.

When the positive deviation ΔY becomes equal to or greater than the threshold (α) for the right turn, that is, the absolute value of the deviation ΔY becomes equal to or greater than the predetermined value α (at time t4), the control mode M is shifted from 0 to 1. As shown in FIGS. 8C, 8D, this enables a leftward moment MT to be calculated which cancels the rightward yaw rate Y which is being exerted on the vehicle 2, and then, a target hydraulic pressure $PT_L$ for the left front and rear wheels 3 is set based on the leftward moment MT, whereby the oversteer condition occurring when the vehicle 2 is taking the right turn comes to be eliminated.

Figure 9:
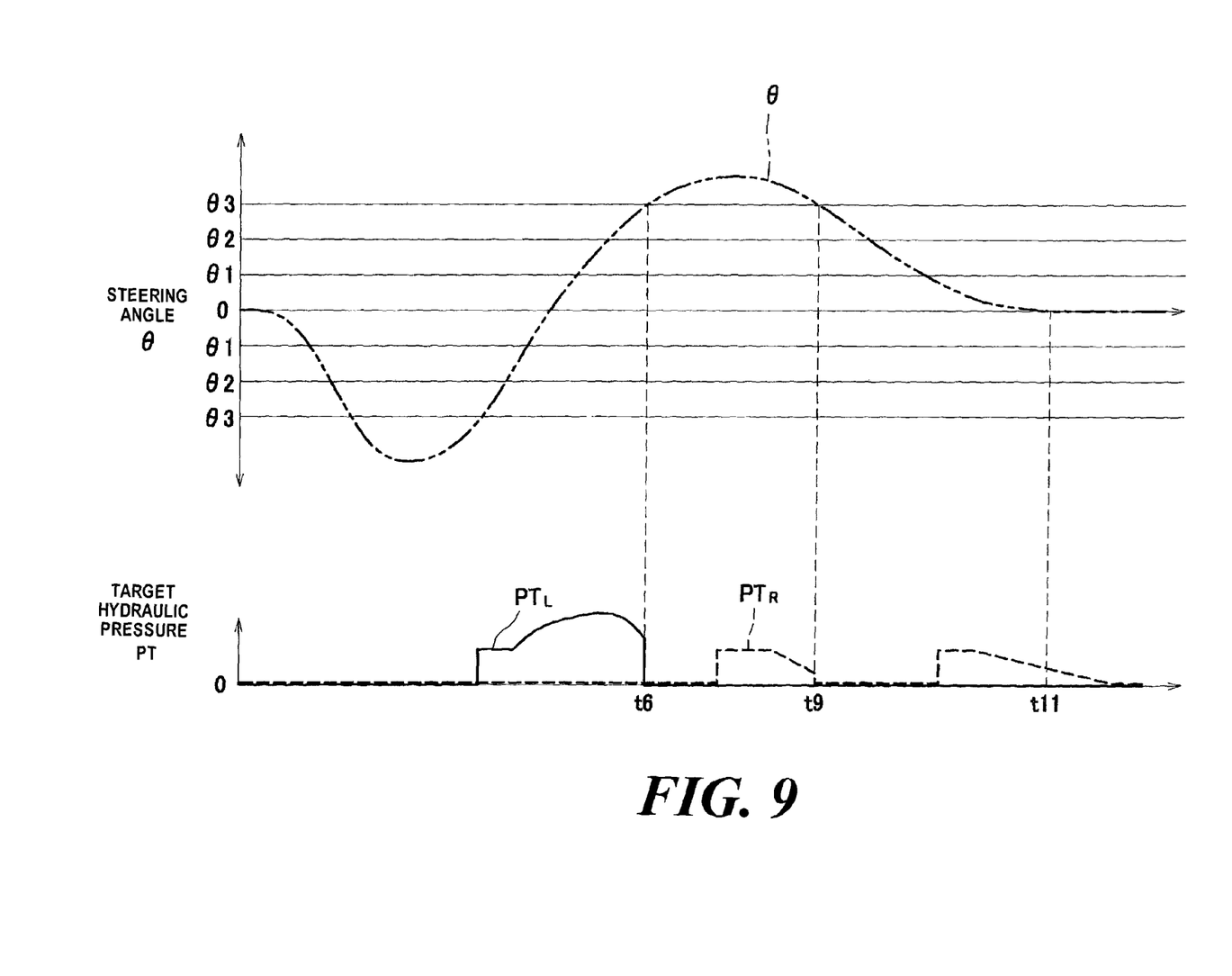
FIG. 9 is a timing chart showing a relationship between an actual steering angle and a target hydraulic pressure.

Thereafter, as shown in FIG. 8(*b*), when the value obtained by multiplying the current yaw rate Yn by the previous yaw rate Yn−1 becomes equal to or smaller than 0, that is, when the direction of the yaw rate Y is switched (at time t6), the control mode M is shifted from 1 to 2. As this occurs, since the steering angle θ is great and the magnitude of the lateral acceleration G is great, that is, the road surface friction coefficient μ is high, the pressure reduction gradient A is set to a great value (for example, A8). Here, a relationship between the steering angle θ shown in FIG. 8(*b*) and the target hydraulic pressure PT shown in FIG. 8(*d*) is shown in FIG. 9. As shown in FIG. 9, the steering angle θ becomes equal to or greater than θ3 at time t6, and the pressure reduction gradient A is set to the great gradient A8 based on the steering angle θ which is so great. Due to this, the target hydraulic pressure PT reduces to 0 momentarily at time t6, and the control mode M is also shifted from 2 to 0 momentarily.

From time t7 and onward, the yaw rate Y is getting greater than the standard yaw rate YS. As this occurs, since the vehicle 2 is taking a left turn, the yaw rate Y and the standard yaw rate YS both take positive values, and as shown in FIG. 8(*a*), the deviation ΔY is calculated as a negative value. When the negative deviation ΔY becomes equal to or smaller than the threshold (−α) for the left turn, that is, when the absolute value of the deviation ΔY is equal to or greater than the predetermined value α (at time t8), the control mode M is shifted from 0 to 1. As shown in FIGS. 8C, 8D, this enables a rightward moment MT to be calculated which cancels the leftward yaw rate Y which is being exerted on the vehicle 2, and a target hydraulic pressure $PT_R$ for the right front and rear wheels 3 is set based on the rightward moment MT, whereby the oversteer condition occurring when the vehicle 2 is taking the left turn comes to be eliminated.

Thereafter, as shown in FIG. 8(*a*), when the negative deviation ΔY becomes greater than the threshold (−α) for the left turn, that is, when the absolute value of the deviation ΔY becomes smaller than the predetermined value α (at time t9), the control mode M is shifted from 1 to 2. As this occurs, since the steering angle θ is great (refer to FIG. 9) and the magnitude of the lateral acceleration G is great, that is, the road surface friction coefficient μ is high, the pressure reduction gradient A is set to a great value (for example, A8). Due to this, the target hydraulic pressure $PT_R$ reduces to 0 momentarily at time t9, and the control mode M is also shifted from 2 to 0 momentarily.

Thereafter, as shown in FIG. 8(*a*), when the negative deviation ΔY becomes equal to or smaller than the threshold (−α) for the left turn (at time t10), the control mode M is shifted from 0 to 1. This resets the rightward moment MT and the target hydraulic pressure $PT_R$ for the right front and rear wheels 3, as shown in FIGS. 8C, 8D.

Thereafter, as shown in FIG. 8(*a*), when the negative deviation ΔY becomes greater than the threshold (−α) for the left turn (at time t11), the control mode M is shifted from 1 to 2. As this occurs, since although the magnitude of the lateral acceleration G is great, the steering angle θ is so small as to be substantially 0 (refer to FIG. 9), the pressure reduction gradient A is set to a small value (for example, A3). This allows the target hydraulic pressure $PT_R$ to reduce gradually along the moderate pressure reduction gradient A from time t11 to time t12. Then, when the target hydraulic pressure $PT_R$ becomes 0, the control mode M is shifted from 2 to 0.

Thus, according to the embodiment that has been described heretofore, the following advantages can be obtained.

When ending the behavior stabilization control, the pressure reduction gradient A for the wheel cylinder pressures is set based on the steering angle θ and the road surface friction coefficient μ. Therefore, for example, in such a situation that the drive tends to feel easily the sensation of abruptness, the pressure reduction gradient A is made so small that the driver can be restricted from feeling the sensation of abruptness. On the other hand, for example, in such a situation that the driver feels the sensation of abruptness with difficulty, the pressure reduction gradient A is made so great that the behavior stabilization control can be ended quickly.

The driver tends to feel the sensation of abruptness more easily as the steering angle θ becomes smaller when ending the behavior stabilization control. Therefore, by setting so that the pressure reduction gradient A becomes smaller as the steering angle θ becomes smaller, the driver can be restricted well from feeling the sensation of abruptness. The lateral acceleration G exerted on the driver becomes greater as the steering angle θ becomes greater when ending the behavior stabilization control, which makes it difficult for the driver to feel the sensation of abruptness. Therefore, by setting so that the pressure reduction gradient A becomes greater as the steering angle θ becomes greater, the behavior stabilization control can be ended quickly without causing the driver to feel the sensation of abruptness.

The driver tends to feel the sensation of abruptness more easily as the road surface friction coefficient μ becomes smaller when ending the behavior stabilization control. Therefore, by setting so that the pressure reduction gradient A becomes smaller as the road surface friction coefficient μ becomes smaller, the driver can be restricted well from feeling the sensation of abruptness. The lateral acceleration G exerted on the driver becomes greater as the road surface friction coefficient μ becomes higher when ending the behavior stabilization control, which makes it difficult for the driver to feel the sensation of abruptness. Therefore, by setting so that the pressure reduction gradient A becomes greater as the road surface friction coefficient μ becomes higher, the behavior stabilization control can be ended quickly without causing the driver to feel the sensation of abruptness.

The road surface friction coefficient μ is calculated based on the lateral acceleration G, and therefore, it is possible to estimate the road surface friction coefficient μ appropriately.

The driver tends to feel the sensation of abruptness particularly when ending the control of restricting the behavior of the vehicle 2 which is under oversteer, and therefore, by setting the pressure reduction gradient A to this situation, it is possible to execute an appropriate control to the feeling of the driver.

The invention is not limited to the embodiment which has been described above but can be applied to various forms which will be described as below as examples.

In the embodiment, the pressure reduction gradient A is set based on the gradient setting map which shows the relationship between the steering angle θ and the road surface friction coefficient μ. However, the invention is not limited thereto, and hence, the pressure reduction gradient may be calculated based, for example, on a calculation expression which shows the relationship between the steering angle and the road surface friction coefficient.

In the embodiment, the control unit 100 (the vehicle control system) controls the various component within the hydraulic unit 10. However, the invention is not limited thereto. For example, the vehicle control system may control an electric brake system in which a braking force is generated by an electric motor without making use of the brake fluid. As this occurs, when ending the behavior stabilization control, a reduction gradient of the braking force generated by the electric motor should be set based on the steering angle and the road surface friction coefficient.

In the embodiment, the road surface friction coefficient μ is estimated based on the lateral acceleration G. However, the invention is not limited thereto, and hence, the road surface friction coefficient may be estimated based on a longitudinal acceleration, for example.

In the embodiment, the invention is applied to the control of restricting the behavior of the vehicle 2 which is under oversteer. However, the invention is not limited thereto, and hence, the invention may be applied, for example, to a control of restricting the behavior of the vehicle 2 which is under understeer.

In the embodiment, the standard yaw rate YS which is calculated based on the steering angle θ and the vehicle speed V is raised as the target yaw rate. However, the invention is not limited thereto, and hence, a value resulting from correcting the standard yaw rate YS of the embodiment appropriately (for example, a correction in which the standard yaw rate YS is limited by a maximum yaw rate that is estimated to be generated in the vehicle) may be referred to as a target yaw rate.

The invention claimed is:

1. A vehicle control system comprising:
   a steering angle acquiring module that acquires a steering angle;
   a yaw rate acquiring module that acquires a yaw rate;
   a road surface friction coefficient estimation module that estimates a road surface friction coefficient;
   a behavior stabilization control module that executes a behavior stabilization control to exert a braking force on a wheel brake when a vehicle is turning to thereby reduce a deviation between the yaw rate and a target yaw rate; and
   a reduction gradient setting module that sets a reduction gradient of the braking force when the behavior stabilization control is to be ended, based on the steering angle and the road surface friction coefficient.

2. The vehicle control system of claim 1, wherein the reduction gradient setting module sets so that the reduction gradient becomes smaller as the steering angle becomes smaller.

3. The vehicle control system of claim 1, wherein the reduction gradient setting module sets so that the reduction gradient becomes smaller as the road surface friction coefficient becomes lower.

4. The vehicle control system of claim 1, further comprising:
   a lateral acceleration acquiring module that acquires a lateral acceleration,
   wherein the road surface friction coefficient estimating module estimates the road surface friction coefficient based on the lateral acceleration.

5. The vehicle control system of claim 1, wherein the reduction gradient setting module sets the reduction gradient when a control of restricting an oversteer behavior of the vehicle is to be ended.

6. The vehicle control system of claim 1, wherein the road surface friction coefficient estimation module estimates the road surface friction coefficient based on lateral acceleration.

7. The vehicle control system of claim 6, wherein the road surface friction coefficient becomes greater as a magnitude of the lateral acceleration becomes greater.

8. The vehicle control system of claim 7, wherein the behavior stabilization control module reduces a deviation between the yaw rate and the target yaw rate by applying a braking force to wheel brakes on turning outer wheels of the vehicle which are turning.

9. The vehicle control system of claim 8, wherein the behavior stabilization control module has a deviation calculation module that calculates the deviation between the yaw rate and the target yaw rate, and the behavior stabilization control module has control intervention determination module that determines whether or not an absolute value of the deviation is equal to or greater than a predetermined value, and when the control intervention determination module determines that the deviation is equal to or greater than the predetermined value, determining that the vehicle is under oversteer, the control intervention determination module starts the behavior stabilization control, when the deviation is positive, the control intervention determination module compares the deviation with a positive threshold for a right turn, when the deviation is negative, the control intervention determination module compares the deviation with a negative threshold for a left turn, and when the deviation is equal to or greater than the positive threshold or equal to or smaller than the negative threshold, the control intervention determination module determines that the vehicle is under oversteer.

10. The vehicle control system of claim 9, wherein when the absolute value of the deviation becomes smaller than the predetermined value or a direction of the yaw rate is switched, determining that the oversteer condition is eliminated, a control end determination module determines that the behavior stabilization control should end, and whether or not the direction of the yaw rate is switched is determined by judging whether or not a value obtained by multiplying a current yaw rate Yn by a previous yaw rate Yn−1 is equal to or smaller than 0.

11. The vehicle control system of claim 10, wherein the reduction gradient setting module sets a pressure reduction gradient for brake hydraulic pressure in the wheel cylinder based on the steering angle and the road surface friction coefficient when the behavior stabilization control ends restricting behavior of the vehicle which is under oversteer.

12. The vehicle control system of claim 11, wherein the behavior stabilization control module has a target hydraulic pressure that gradually reduces the pressure reduction gradient which is set by the reduction gradient setting module, when a previous target hydraulic pressure is smaller than an amount of pressure reduction per unit time, it is set so that a current target hydraulic pressure becomes 0, when the current target hydraulic pressure becomes 0, a target hydraulic pressure setting module changes a control mode to a non-controlling mode.

13. The vehicle control system of claim 12, wherein the behavior stabilization control module has a control execution module that controls a hydraulic unit based on the target hydraulic pressure which is set by the target hydraulic pressure setting module so that the wheel cylinder pressures of the turning outer wheels become the target hydraulic pressure.

14. The vehicle control system of claim 13, wherein the control end determination module determines whether or not the absolute value of the deviation is smaller than the predetermined value, and if it is determined that the absolute value of the deviation is smaller than the predetermined value, the control end determination module determines that the behavior stabilization control should end and shifts the control mode which indicates that the end of the behavior stabilization control is being processed.

15. The vehicle control system of claim 14, wherein even if the absolute value of the deviation is not smaller than the predetermined value, the control end determination module determines whether or not $Yn \cdot Yn-1 \leq 0$, if it is determined that $Yn \cdot Yn-1 \leq 0$, the control end determination module determines that the behavior stabilization control should end and shifts the control mode which indicates that the end of the behavior stabilization control is being processed, and if it is not determined that $Yn \cdot Yn-1 \leq 0$, the control end determination module ends operations without shifting the control mode.

* * * * *